US008848569B2

(12) United States Patent
Wang et al.

(10) Patent No.: US 8,848,569 B2
(45) Date of Patent: Sep. 30, 2014

(54) METHOD AND DEVICE FOR POWER CONTROL IN NON-ADAPTIVE RETRANSMISSION

(75) Inventors: Lin Wang, Shenzhen (CN); Peng Zhang, Shenzhen (CN); Liping Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 157 days.

(21) Appl. No.: 13/576,397

(22) PCT Filed: May 17, 2010

(86) PCT No.: PCT/CN2010/072853
§ 371 (c)(1),
(2), (4) Date: Aug. 1, 2012

(87) PCT Pub. No.: WO2011/120252
PCT Pub. Date: Oct. 6, 2011

(65) Prior Publication Data
US 2012/0300665 A1  Nov. 29, 2012

(30) Foreign Application Priority Data
Mar. 31, 2010  (CN) .......................... 2010 1 0141462

(51) Int. Cl.
*H04L 1/00* (2006.01)
*H04W 4/00* (2009.01)
*G08C 17/00* (2006.01)

(52) U.S. Cl.
USPC ........... 370/252; 370/311; 370/328; 455/507; 455/522

(58) Field of Classification Search
USPC ................ 370/252–280, 318–329, 345–442; 455/507–522
See application file for complete search history.

(56) References Cited

U.S. PATENT DOCUMENTS 6,490,460 B1 *  12/2002  Soliman ........................ 455/522
6,904,290 B1 *  6/2005  Palenius ........................ 455/522
(Continued)

FOREIGN PATENT DOCUMENTS

CN       1741408 A       3/2006
CN       101621365 A     1/2010
(Continued)

OTHER PUBLICATIONS

International Search Report in international application No. PCT/CN2010/072853, mailed on Jan. 6, 2011.
(Continued)

*Primary Examiner* — Man Phan
(74) *Attorney, Agent, or Firm* — Oppedahl Patent Law Firm LLC

(57) ABSTRACT

The disclosure discloses a method and device for power control in non-adaptive retransmission. The solution thereof includes: when UE does not obtain a TPC adjustment value of a current HARQ process by parsing, determining a current power control mode; if the mode is an accumulation mode, determining whether the calculated sum of TPC adjustment values of each HARQ process is smaller than a given threshold, if yes, obtaining a transmission power by adding an increment adjustment value to a retransmission power, otherwise, calculating the transmission power of UE according to a formula in a protocol; if the mode is an absolute value mode, obtaining a transmission power by adding an increment adjustment value to a retransmission power. The solution can improve the SINR detected by an eNB and improve a retransmission success rate, thereby saving radio resources, facilitating utilization of radio resources and reduction of transmission delay, improving the throughput rate of an LTE system and improving the system performance.

27 Claims, 3 Drawing Sheets

(56) References Cited

U.S. PATENT DOCUMENTS

| | | |
|---|---|---|
| 7,657,277 B2 * | 2/2010 | Montojo et al. ............... 455/522 |
| 8,081,997 B2 * | 12/2011 | Sambhwani et al. ......... 455/522 |
| 2009/0175187 A1 * | 7/2009 | Jersenius et al. .............. 370/252 |
| 2009/0318180 A1 * | 12/2009 | Yi et al. ........................ 455/522 |
| 2010/0246463 A1 * | 9/2010 | Papasakellariou et al. ... 370/311 |
| 2010/0323744 A1 * | 12/2010 | Kim et al. ..................... 455/522 |
| 2011/0194500 A1 * | 8/2011 | Kim et al. ..................... 370/328 |
| 2011/0194501 A1 * | 8/2011 | Chung et al. .................. 370/328 |
| 2011/0244905 A1 * | 10/2011 | Burstrom et al. ............. 455/507 |
| 2011/0306383 A1 * | 12/2011 | Lee et al. ...................... 455/522 |

FOREIGN PATENT DOCUMENTS

| | | |
|---|---|---|
| CN | 101640556 A | 2/2010 |
| RU | 2327296 C2 | 6/2008 |
| RU | 2332797 C2 | 8/2008 |

OTHER PUBLICATIONS

English Translation of the Written Opinion of the International Search Authority in international application No. PCT/CN2010/072853, mailed on Jan. 6, 2011.

Technical Specification Group Radio Access Network Sep. 2009.

\* cited by examiner

METHOD AND DEVICE FOR POWER CONTROL IN NON-ADAPTIVE RETRANSMISSION

TECHNICAL FIELD

The present disclosure relates to communication technologies and in particular to a method and a device for power control when User Equipment (UE) performs non-adaptive retransmission in a Long Term Evolution (LTE) system.

BACKGROUND

In a radio communication system, uplink power control plays an important role; on one hand, UE is required to have enough transmit power to meet required Quality of Service (QoS), on the other hand, user interference in the system needs to be reduced to overcome the influence of path loss, fast fading and shadow fading of a radio environment on radio signal transmission; besides, energy consumption of UE needs to be saved as far as possible. Power control plays a very important role in performance improvement of the radio communication system.

Since different UEs in a cell of an LTE system use different time-frequency resources, user interference in the cell is relatively small. The uplink power control of the LTE system includes power control of a Physical Uplink Shared Channel (PUSCH), a Physical Uplink Control Channel (PUCCH), a Physical Random Access Channel (PRACH) and a Sounding Reference Symbol (SRS). The power control described below refers to the uplink power control.

Hybrid Automatic Repeat Request (HARQ) is one of error control techniques of which the purpose is to improve signal transmission quality and guarantee information reliability. The HARQ is an error correction method which combines an Automatic Repeat Request (ARQ) technique and a Forward Error Correction (FEC) technique, and is an implicit link adaptation technique based on a link layer. The FEC technique refers to that error correction is performed based on redundant information in received data; The ARQ technique guarantees signal quality based on a error code detection and a retransmission request; the HARQ of the LTE system is divided into adaptive retransmission and non-adaptive retransmission, and the difference between the adaptive retransmission and the non-adaptive retransmission is whether modulation and coding schemes (MCS) used for retransmission are the same and whether radio resources used for retransmission are the same.

In a protocol, there is a Transmit Power Control (TPC) adjustment item in a PUSCH power calculation formula; the TPC adjustment value belongs to a closed loop power adjustment and is a power adjustment value which is determined by an evolved Node B (eNB) according to a measured Signal To Interference Plus Noise Ratio (SINR) and a target SINR and other factors, and is fed back to UE through a Physical Downlink Control Channel (PDCCH).

The mode of power control can be divided into two modes, namely an accumulation mode and an absolute value mode. The accumulation mode is to adjust step by step based on previously accumulated power, while the absolute value mode is to adjust to a target value directly and is only effective for PUSCH data transmitted within a current Transmission Time Interval (TTI); compared with the accumulation mode, the absolute value mode can adjust the transmit power of UE more rapidly. The specific power control mode applied by UE is configured by a Radio Resources Control (RRC) layer. The TPC adjustment value can be transmitted to UE independently through Downlink Control Information (DCI) format 0 (referred to DCI0 for short) of a PDCCH, or can be transmitted to the UE through DCI format 3/3A (referred to DCI3/3A for short) after being jointly encoded with a TPC adjustment value of other UE; if DCI0 exists, the TPC adjustment value indicated by the DCI3/3A is not necessarily taken into account.

For new data transmission and PUSCH adaptive retransmission, an eNB certainly transmits DCI0 through a PDCCH, wherein a power value that UE needs to adjust (i.e., a TPC adjustment value) is accordingly included in the DCI0. While for non-adaptive retransmission, an eNB can transmit a power value that UE needs to adjust through DCI3/3A, however, the number of UEs contained in the DCI3/3A is limited, wherein the DCI3 can contain adjustment values of $$N = \left\lfloor \frac{L_{format\,0}}{2} \right\rfloor$$

UEs at most, the DCI3A can contain TPC adjustment values of $L_{format\,0}$ UEs at most, the $L_{format\,0}$ is the number of bits of DCI0 and correlates with an eNB scheduling algorithm; therefore, it can not be guaranteed that each UE obtains its own TPC adjustment value. At this moment, a high SINR might not be obtained for the eNB for correct decoding even after several times of retransmission carried out by UE, thus retransmission radio resources are wasted, a transmission delay is increased and a throughput rate of an LTE system is reduced.

SUMMARY

In view of the problems above, the technical problem to be solved by the present disclosure is to provide a method and a device for power control in UE non-adaptive retransmission in an LTE system, for effectively improving an SINR detected by an eNB and improving a success rate of retransmission, thereby saving radio resources and improving performance of the LTE system.

In order to solve the technical problem above, the technical scheme of the present disclosure is realized as follows:

a method for power control in non-adaptive retransmission, including:

determining a current mode of power control when UE does not obtain a TPC adjustment value of a current retransmission HARQ process by parsing;

when the mode of the power control is an accumulation mode, determining whether a calculated sum of TPC adjustment values of each HARQ process is smaller than a given threshold; if it is smaller than the given threshold, then obtaining a transmission power by adding an increment adjustment value to a retransmission power, otherwise, calculating a transmission power of the UE according to a formula in a protocol; and when the mode of the power control is an absolute value mode, obtaining a transmission power by adding an increment adjustment value to a retransmission power.

Before the not obtaining a Transmit Power Control (TPC) adjustment value of a current retransmission HARQ process by parsing, the method may further include: waiting Physical HARQ Indicator Channel (PHICH) information corresponding to the HARQ process, and performing HARQ non-adaptive retransmission when Negative Acknowledgement (NACK) is obtained by parsing the PHICH information.

The threshold may be an integer in a range of [−4, +4].

The increment adjustment value may be a minimum adjustment step regulated by an LTE physical layer protocol in a corresponding mode of the power control.

In the process of calculating a sum of TPC adjustment values of each HARQ process, the increment adjustment value may be not added to the sum of the TPC adjustment values.

When the power control is performed by adopting the absolute value mode and first retransmission is performed, the method may further include: determining whether an TPC adjustment value during new data transmission is smaller than 0, if it is smaller than 0, then an increment adjustment value of the first retransmission is an absolute value of the TPC adjustment value during new data transmission.

Before the obtaining a transmission power by adding an increment adjustment value to a retransmission power, the method may further include: increasing the increment adjustment value as increase of retransmission times.

A device for power control in non-adaptive retransmission, including:

a parsing module configured to trigger a first determining module when not obtaining a Transmit Power Control (TPC) adjustment value of a current retransmission Hybrid Automatic Repeat Request (HARQ) process by parsing;

a first determining module configured to determine a current mode of power control; if the mode of the power control is an accumulation mode, to trigger a second determining module; if the mode of the power control is an absolute value mode, to trigger a first power calculation module;

a second determining module configured to determine whether a calculated sum of TPC adjustment values of each HARQ process is smaller than a given threshold; if it is smaller than the given threshold, to trigger a first power calculation module, otherwise, to trigger a second power calculation module;

a first power calculation module configured to obtain a transmission power by adding an increment adjustment value to a retransmission power; and a second power calculation module configured to calculate a transmission power of the UE according to a formula in a protocol.

The parsing module may be further configured to wait Physical HARQ Indicator Channel (PHICH) information corresponding to the HARQ process, and determining that HARQ non-adaptive retransmission is needed when NACK is obtained by parsing the PHICH information.

When the power control is performed by adopting an absolute value mode and first retransmission is performed, the first power calculation module may be further configured to determine whether an TPC adjustment value during new data transmission is smaller than 0, if it is smaller than 0, then an increment adjustment value of the first retransmission is an absolute value of the TPC adjustment value during new data transmission.

The first power calculation module may be further configured to increase the increment adjustment value as increase of retransmission times.

The second determining module may be further configured to calculate the sum of the TPC adjustment values of each HARQ.

The second determining module may be further configured to not add the increment adjustment value to the TPC adjustment value.

The device may further include:

a threshold setting module configured to set a threshold; and/or, a step setting module configured to set a minimum adjustment step regulated by an LTE physical layer protocol in a corresponding mode of the power control.

By the present disclosure, when UEs perform PUSCH non-adaptive retransmission, for the UE which does not obtain a TPC adjustment value by parsing at a corresponding retransmission moment, in the case that a power control mode is an absolute value mode or is an accumulation mode but with smaller services (the sum of TPC adjustment values from new data transmission to retransmission is relatively small), since the amount which should be adjusted by the current power control is not fed back from an eNB, both new transmission power and retransmission power reaching an eNB receiver probably are kept at a relatively low level, even the retransmission power is lower than the new transmission power (for example, in the condition that an TPC adjustment value of the UE which adopts the absolute value mode of the power control is a negative number during the new data transmission), in order to avoid the case above, the UE will properly adjust the retransmission power. By properly adjusting the retransmission power, the present disclosure can improve the SINR detected by the eNB and can improve the success rate of retransmission, thereby saving radio resources, facilitating the utilization of radio resources and the reduction of transmission delay, improving the throughput rate of the LTE system and improving the system performance.

DETAILED DESCRIPTION

The present disclosure provides a power control scheme for PUSCH non-adaptive retransmission. The main idea of the present disclosure is that: the sum of power adjustment values of each HARQ process is calculated (the sum of the power adjustment values is calculated only when the mode of power control is an accumulation mode; when the mode of the power control is an absolute value mode, the power adjustment value sum is the opposite number of a TPC adjustment value corresponding to new transmission) in the case of PUSCH non-adaptive retransmission; if DCI3/3A corresponding to the retransmission HARQ process is not obtained by parsing, then the power adjustment value sum is needed to be determined; if the power adjustment value sum is smaller than a given threshold, a small adjustment factor (i.e., an increment is adjustment value) is added to a retransmission power value to compensate the defect of TPC adjustment value absence so as to improve a retransmission success rate. Besides, the increment adjustment value also can be increased as the increase of retransmission times, that is, the more the retransmission times are, the greater the increment adjustment value is increased by.

In the description above, when the mode of the power control is the absolute value mode, the reason why the power adjustment value sum is set as the opposite number of the TPC adjustment value corresponding to new transmission is that:

for example, the power of new transmission is expressed as x+y, wherein y expresses the TPC adjustment value of new transmission; when y is a negative number, during non-adaptive retransmission, the retransmission power is increased by y relative to the new transmission power when power x is adopted. Therefore, defining a power adjustment value sum as the opposite number of y means that a new-transmission power is increased by a value relative to a retransmission power; during retransmission, this value is compensated to guarantee that the retransmission power is not smaller than the new-transmission power at least.

The technical scheme of the present disclosure is illustrated below in detail in conjunction with accompanying drawings and specific embodiments.

Figure 1:
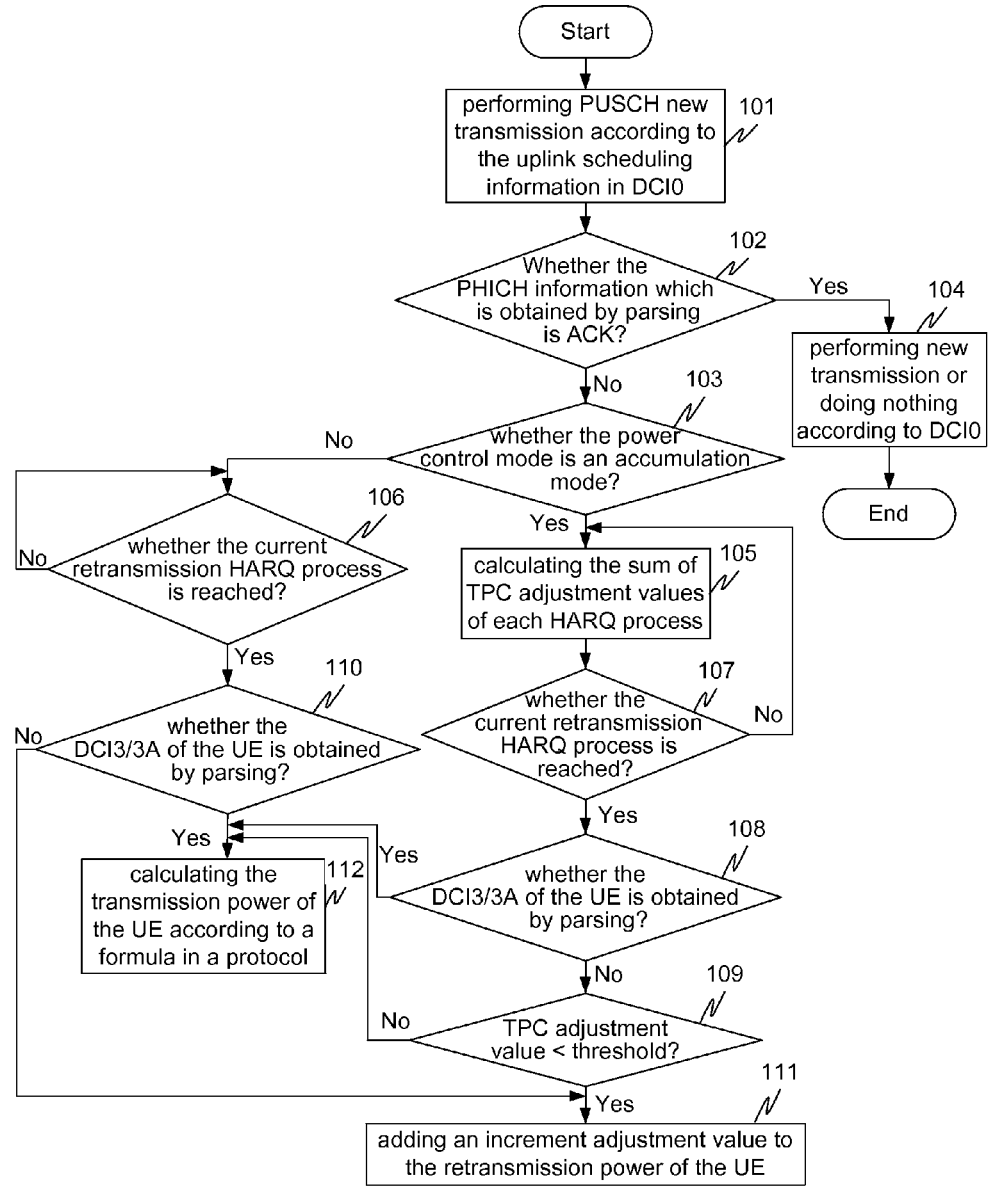
FIG. 1 shows a flow diagram of power control in non-adaptive retransmission performed by UE according to the present disclosure.

Referring to FIG. 1, a process flowchart of power control in non-adaptive retransmission performed by UE according to the present disclosure is shown, specifically comprising the steps:

step 101: UE performs PUSCH new transmission according to uplink scheduling information in DCI0;

step 102: after the UE finishes sending new data, the UE waits corresponding Physical HARQ Indicator Channel (PHICH) information and determines whether the PHICH information obtained by parsing is ACK (acknowledgement), if the obtained fed-back HARQ information, i.e., the PHICH information, is not ACK but NACK, moreover, no new DCI0 is obtained by parsing to perform adaptive retransmission, it indicates that non-adaptive retransmission is needed, then step 103 is to be executed; if the obtained PHICH information is ACK, then step 104 is to be executed;

step 103: the UE determines whether the current mode of the power control is an accumulation mode or an absolute value mode in the current retransmission HARQ process; if the power control mode is the accumulation mode, the step 105 is to be executed; if the power control mode is the absolute value mode, then step 106 is to be executed; specifically, the UE determines whether the current mode of the power control is an accumulation mode or an absolute value mode based on a value of a power control parameter configured by an RRC layer;

step 104: the UE performs corresponding processes based on whether DCI0 exists or not; the current power control flow in non-adaptive retransmission is ended;

specifically, if DCI0 exists, the UE performs new transmission or adaptive retransmission according to New Data Indication (NDI) in the DCI0; if DCI0 does not exist, the UE does not perform corresponding processes;

step 105: the UE calculates TPC adjustment values of each HARQ process after new transmission is performed, and takes the sum of all TPC adjustment values as a new TPC adjustment value, then step 107 is to be executed;

step 106: the UE determines whether the current retransmission HARQ process is reached, if reached, step 110 is to be executed; otherwise, step 106 continues be executed, and the UE determines whether the current retransmission HARQ process is reached;

step 107: the UE determines whether the current retransmission HARQ process is reached, if reached, step 108 is to be executed; otherwise, step 105 is to be executed;

step 108: the UE determines whether DCI3/3A of the UE is obtained by parsing, that is, whether a TPC adjustment value of the current retransmission HARQ process is obtained by parsing, if the DCI3/3A is obtained by parsing, step 112 is to be executed; otherwise, step 109 is to be executed;

step 109: the UE determines whether the TPC adjustment value is smaller than a given threshold; if it is smaller than the given threshold, then it indicates that the TPC adjustment value can not reflect a channel change truly, and step 109 is to be executed; otherwise, step 112 is to be executed, the TPC adjustment value referred in step 112 is the sum of TPC adjustment values of each HARQ process between new transmission and retransmission;

a specific threshold can be set based on the data obtained by simulation experiment, such as an integer in the range of [−4, +4]; for simplicity, one way is to only determine whether the TPC adjustment value is an positive number, therefore, 0 is set as a threshold;

step 110: the UE determines whether DCI3/3A of the UE is obtained by parsing, that is, whether a TPC adjustment value of the current retransmission HARQ process is obtained by parsing, if the DCI3/3A is obtained, step 111 is to be executed; otherwise, step 109 is executed;

step 111: the UE adds an increment adjustment value to a retransmission power and performs HARQ non-adaptive retransmission by using the power obtained by adding the increment adjustment value;

the increment adjustment value can be a value which is the minimum adjustment step regulated by a protocol in a corresponding mode, for example, the minimum adjustment step is 1 dB in the accumulation mode; while the minimum adjustment step is 2 dB in the absolute value mode;

it should be noted that the increment adjustment value is not added to the real calculation of the sum of TPC adjustment values in the accumulation mode of a power control, that is, it does not influence PUSCH transmission of other HARQ processes; and step 112: the UE calculates a transmission power of the UE on the PUSCH at the current TTI according to a formula in 3GPP TS 36.213 protocol:

$$P_{PUSCH}(i) = \min\{P_{CMAX}, 10\log_{10}(M_{PUSCH}(i)) + P_{O\_PUSCH}(j) + \alpha(j) \cdot PL + \Delta_{TF}(i) + f(i)\} \text{dbm};$$

wherein $P_{CMAX}$ expresses the maximum transmission power of UE; $M_{PUSCH}(i)$ expresses the number of resource blocks at the TTI; $P_{O\_PUSCH}(j)) \alpha(j)$ express the parameters configured by a high layer of system; PL (Path Loss) expresses a path loss value; $\Delta_{TF}(i)$ expresses a power adjustment amount related to Modulation and Coding Scheme (MCS); f (i) expresses a TPC adjustment value.

Further, after step 111, if NACK is received on the PHICH, step 103 is executed repeatedly; otherwise, if ACK is received on the PHICH, corresponding operations are performed respectively based on the existence and absence of DCI0.

After the UE finishes PUSCH new transmission, the corresponding PHICH information is fed back by an eNB after four sub-frames.

Since the power control mode of UE includes the absolute value mode and the accumulation mode, the technical scheme of the present disclosure is illustrated exemplarily by specific examples in specific application.

Example 1

Figure 2:
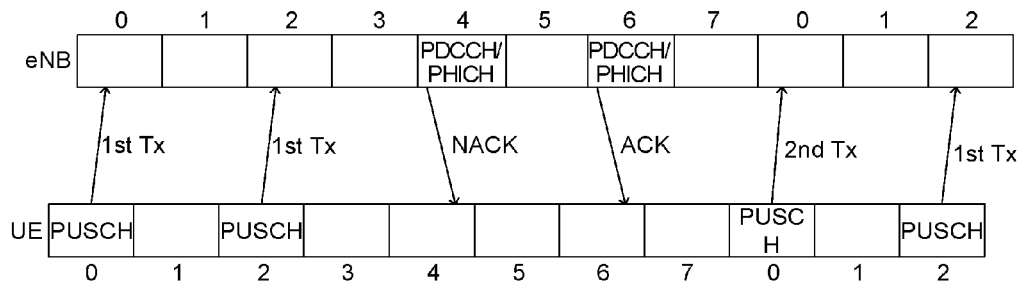
FIG. 2 illustrates an FDD HARQ process in a related art.

Referring to FIG. 2, a Frequency Division Duplex (FDD) system is taken as an example, uplink HARQ has eight processes totally, numbered from 0 to 7 in turn, and each TTI process number adds 1 correspondingly. In this example, UE adopts the absolute value mode of power control.

If UE sends a packet of newly transmitted PUSCH data in the process of HARQ ID=0, after four sub-frames, the UE obtains NACK by parsing PHICH information, the NACK indicating a transmission failure of newly transmitted data; since the DCI0 in the PDCCH is not detected in the subframe, the UE will perform HARQ non-adaptive retransmission, that is, the UE performs non-adaptive retransmission according to the MCS and radio resources configured for the new transmission. If the UE does not parse out a TPC adjustment value matched with the UE itself either in the DCI3/3A of PDCCH, there is no TPC adjustment value during retransmission performed by UE in the related art, therefore, the retransmission might be performed with a power smaller than the power of the new transmission (if the TPC adjustment value is a positive number during the new transmission).

Now, based on a flow provided by the present disclosure, improvements are made below to power control in retransmission in this situation:

step A1: when PUSCH new transmission is performed (corresponding to HARQ ID=0), obtaining that a TPC adjustment value of the new transmission is TPC0 which is in a range of {−4, −1, +1, +4}dB according to the saved 2-bit TPC information reference table 1 (in a present protocol) in the DCI0 code stream of the new transmission;

step A2: parsing PHICH information of the new-transmission HARQ process; if NACK is obtained after parsing the PHICH information and the maximum number of retransmission times is not reached, then executing step A3; if ACK is obtained or the maximum number of retransmission times is reached, ending the current flow; and step A3: determining whether TPC0 is a positive number or a negative number, when TPC0<0, since the power control mode is the absolute value mode, performing no adjustment during first retransmission, which is equivalent to that a retransmission power is increased by |TPC0| relative to a new transmission power; during second retransmission, adding an increment adjustment value delta, which is 2 dB is for example, to the first retransmission power; and so on;

when TPC0>0, a retransmission power is smaller than a new transmission by TPC0 dB if retransmission is performed in accordance with protocols, because there is no TPC indication, thus the success rate of the retransmission will be reduced greatly; therefore, for solving the problem existing in this case, during first retransmission, it should be guaranteed that the retransmission power is the same as the new transmission power at least; if retransmission is performed for several times, a delta can be added based on the new transmission; then the PUSCH retransmission is performed and the PHICH information is waited, then step A2 is executed;

It can be known from this application example above that, according to the power control method provided by the present disclosure, a retransmission power can be guaranteed not smaller than a new transmission power during non-adaptive retransmission in which the absolute value mode of power control is adopted; if there has been no TPC adjustment value fed back from eNB, an adjustment value delta can be increased when retransmission is performed for a plurality of times.

Example 2

An FDD system is taken as an example, provided that UE adopts the accumulation mode of power control, that is, the current transmission is influenced by a previous transmit power value; the UE has to make a fine adjustment based on the previous power value according to a TPC indication.

If new transmission is performed in sub-frame i and the new transmission is failed, then corresponding retransmission will occur in sub-frame i+8; a power adjustment value of accumulation mode is as follows based on protocol regulations: $f(i)=f(i-1)+\delta_{PUSCH}(i-K_{PUSCH})$, wherein $K_{PUSCH}$ is a parameter of the FDD system and has a fixed value of 4;

$\delta_{PUSCH}(i)$ expresses a TPC adjustment value in DCI0/3/A corresponding to the ith frame and can be obtained by looking up Table 1 or Table 2; wherein Table 1 contains the power adjustment values corresponding to TPC in DCI0/3 in the related art; Table 2 contains the power adjustment values corresponding to TPC in DCI3A in the related art.

TABLE 1

| TPC adjustment value in DCI0/3 | $\delta_{PUSCH}$ [dB] of accumulation mode | $\delta_{PUSCH}$ [dB] of absolute value mode (only for DCI0) |
|---|---|---|
| 0 | −1 | −4 |
| 1 | 0 | −1 |
| 2 | 1 | 1 |
| 3 | 3 | 4 |

TABLE 2

| TPC adjustment value in DCI3A | $\delta_{PUSCH}$ [dB] |
|---|---|
| 0 | −1 |
| 1 | 1 |

In retransmission: $f(i+8)=f(i+7)+\delta_{PUSCH}(i+4)$ $$f(i+7)=f(i+6)+\delta_{PUSCH}(i+3)\ldots$$

$$f(i+1)=f(i)+\delta_{PUSCH}(i-3)$$

It can be deduced that $$f(i+8) = f(i) + \sum_{n=-3}^{4} \delta_{PUSCH}(i+n).$$

From the deduction above, it can be known that a retransmission power and a new transmission power have a difference of $$\sum_{n=-3}^{4} \delta_{PUSCH}(i+n).$$

For non-adaptive retransmission, there is no DCI0 indication in the (i+4)th sub-frame; if the DCI3/3A of the UE is not parsed out in this sub-frame, that is, $\delta_{PUSCH}(i+4)=0$, then a retransmission power value is adjusted by the method provided by the present disclosure:

step B1: the power value change is $$\sum_{n=-3}^{3} \delta_{PUSCH}(i+n)$$

between the retransmission and the new transmission; operating according to a PHICH feedback from the (i+4)th sub-frame and the existence/absence of the DCI3/3A of the UE; if the PHICH feedback is ACK, indicating that the transmission in the ith sub-frame is successful, then ending the current flow; if the PHICH feedback is NACK and the DCI3/3A of the UE exists, performing power control on retransmitted data according to a corresponding TPC adjustment value, then ending the current flow; if DCI3/3A does not exist, entering into step B2;

and step B2: determining whether $$\sum_{n=-3}^{3} \delta_{PUSCH}(i+n) > 0$$

is satisfied; if $$\sum_{n=-3}^{3} \delta_{PUSCH}(i+n) > 0$$

is not satisfied, adding an increment adjustment value delta (which is 1 dB) to a retransmission power value of the (i+8)th sub-frame; waiting the PHICH feedback of the retransmission, entering into step B1; if $$\sum_{n=-3}^{3} \delta_{PUSCH}(i+n) > 0$$

is satisfied, calculating the transmission power of UE according to a formula in a protocol.

Figure 3:
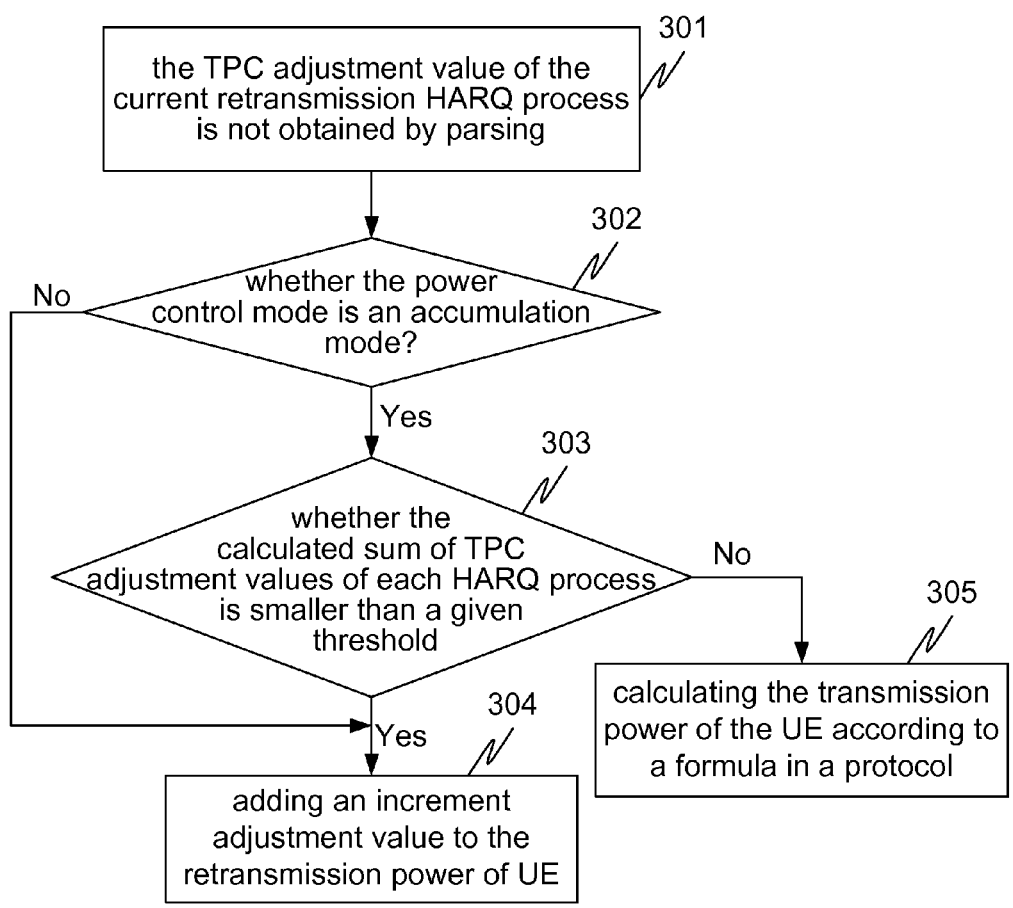
FIG. 3 shows a basic flow diagram of power control in non-adaptive retransmission performed by UE according to the present disclosure.

From the description above, the basic flow of the present disclosure is as shown in FIG. 3 and UE performs processing with the following steps:

step 301 to step 302: determining the current mode of power control when a TPC adjustment value of the current retransmission HARQ process is not obtained by parsing, that is, the DCI3/3A corresponding to the UE is not obtained by parsing; when the mode of the power control is the accumulation mode, executing step 303; when the mode of the power control is the absolute value mode, executing step 304;

step 303: determining whether the calculated sum of TPC adjustment values of each HARQ process is smaller than a given threshold, if it is smaller than the given threshold, executing step 304; otherwise, executing step 305; wherein the HARQ process refers to the HARQ process of new data transmission and each HARQ process of corresponding data retransmission;

step 304: obtaining a transmission power by adding an increment adjustment value to a retransmission power, wherein the UE performs HARQ non-adaptive retransmission by using the transmission power;

the increment adjustment value is a minimum adjustment step regulated by an LTE physical layer protocol in a corresponding mode of power control;

when the power control is performed by adopting the absolute value mode and first retransmission is performed, it is determined whether an TPC adjustment value during new data transmission is smaller than 0, if it is smaller than 0, the increment adjustment value of the first retransmission is the absolute value of the TPC adjustment value during new data transmission; in the following HARQ retransmission process, the increment adjustment value can be kept fixed, also can be increased as the increase of retransmission times; the step increased each time can be set according to actual requirement;

step 305: calculating the transmission power of the UE according to a formula in a protocol, wherein the specific formula can be referred to the description in step 112 in FIG. 1, in which the TPC adjustment value is the sum of TPC adjustment values of each HARQ process.

Figure 4:
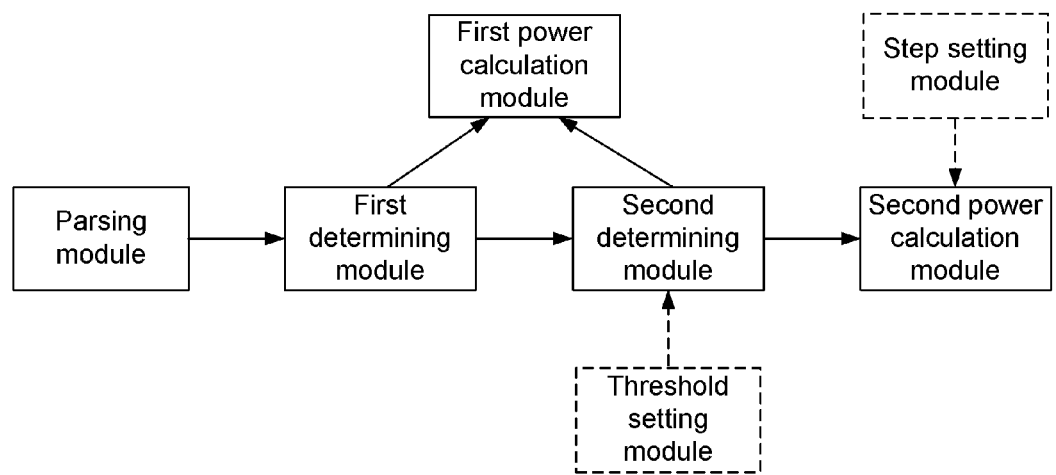
FIG. 4 shows a structure diagram of a device for power control in non-adaptive retransmission performed by UE according to the present disclosure.

The structure diagram of the device provided by the present disclosure for power control in non-adaptive retransmission is as shown in FIG. 4, wherein the device comprises a parsing module, a first determining module, a second determining module, a first power calculation module and a second power calculation module, wherein the parsing module 501 is configured to trigger the first determining module when not obtaining a TPC adjustment value of a current retransmission HARQ process;

the first determining module is configured to determine a current mode of power control; if the mode of the power control is an accumulation mode, to trigger the second determining module; if the mode of the power control is an absolute value mode, to trigger the first power calculation module;

the second determining module is configured to determine whether the calculated sum of TPC adjustment values of each HARQ process is smaller than a given threshold; if it is smaller than the given threshold, to trigger the first power calculation module, otherwise, to trigger the second power calculation module;

the first power calculation module is configured to obtain a transmission power by adding an increment adjustment value to a retransmission power;

the second power calculation module is configured to calculate a transmission power of the UE according to a formula in a protocol.

The parsing module is further configured to wait PHICH information corresponding to the HARQ process, determine that HARQ non-adaptive retransmission is needed when NACK is obtained by parsing the PHICH information.

When the power control is performed by adopting an absolute value mode and first retransmission is performed, the first power calculation module is further configured to determine whether a TPC adjustment value during new data transmission is smaller than 0, if it is smaller than 0, the increment adjustment value of the first retransmission is the absolute value of the TPC adjustment value during new data transmission. In the following HARQ retransmission process, the first power calculation module is further configured to increase the increment adjustment value as retransmission times increase; a step increased each time can be set according to actual requirement;

In a preferred embodiment of the present disclosure, the device further comprises:

a threshold setting module configured to set a threshold in a range of [−4, +4], the threshold specifically being 0.

In a preferred embodiment of the present disclosure, the device further comprises:

a step setting module configured to set a minimum adjustment step required when the transmission power of the UE is calculated according to the formula in the protocol, that is, the minimum adjustment step regulated by an LTE physical layer protocol in a corresponding power control mode; specifically, the minimum adjustment step can be 1 dB when the power control is performed by adopting the accumulation mode; the minimum adjustment step can be 2 dB when the power control is performed by adopting the absolute value mode;

the second determining module is further configured to calculate the sum of TPC adjustment values of each HARQ process; in another preferred embodiment of the present disclosure, the second determining module is further configured to not add the increment adjustment value to the TPC adjustment value, and not influence PUSCH transmission of other HARQ processes.

It should be noted that the above are only the preferred embodiments of the present disclosure and not intended to limit the technical scheme of the present disclosure. Any equivalent substitute or corresponding improvement made by those skilled in the art based on the characteristics of the present disclosure are deemed to be included within the protection scope of the present disclosure. The patent protection scope of the present disclosure is subject to the claims accompanied.

The invention claimed is:

1. A method for power control in non-adaptive retransmission, comprising:
   determining a current mode of power control when User Equipment (UE) does not obtain a Transmit Power Control (TPC) adjustment value of a current retransmission Hybrid Automatic Repeat Request (HARQ) process by parsing;
   when the mode of the power control is an accumulation mode, determining whether a calculated sum of TPC adjustment values of each HARQ process is smaller than a given threshold; if it is smaller than the given threshold, then obtaining a transmission power by adding an increment adjustment value to a retransmission power, otherwise, calculating a transmission power of the UE according to a formula in a protocol;
   when the mode of the power control is an absolute value mode, obtaining a transmission power by adding an increment adjustment value to a retransmission power.

2. The method according to claim 1, further comprising: before the not obtaining a Transmit Power Control (TPC) adjustment value of a current retransmission HARQ process by parsing, waiting Physical HARQ Indicator Channel (PHICH) information corresponding to the HARQ process, and performing HARQ non-adaptive retransmission when Negative Acknowledgement (NACK) is obtained by parsing the PHICH information.

3. The method according to claim 1, wherein the threshold is an integer in a range of [−4, +4].

4. The method according to claim 1, wherein the increment adjustment value is a minimum adjustment step regulated by a Long Term Evolution (LTE) physical layer protocol in a corresponding mode of the power control.

5. The method according to claim 1, wherein in the process of calculating a sum of TPC adjustment values of each HARQ process, the increment adjustment value is not added to the sum of the TPC adjustment values.

6. The method according to claim 1, further comprising: when the power control is performed by adopting the absolute value mode and first retransmission is performed, determining whether an TPC adjustment value during new data transmission is smaller than 0, if it is smaller than 0, then an increment adjustment value of the first retransmission is an absolute value of the TPC adjustment value during new data transmission.

7. The method according to claim 6, further comprising: before the obtaining a transmission power by adding an increment adjustment value to a retransmission power, increasing the increment adjustment value as increase of retransmission times.

8. A device for power control in non-adaptive retransmission, comprising:
   a parsing module configured to trigger a first determining module when not obtaining a Transmit Power Control (TPC) adjustment value of a current retransmission Hybrid Automatic Repeat Request (HARQ) process by parsing;
   a first determining module configured to determine a current mode of power control; if the mode of the power control is an accumulation mode, to trigger a second determining module; if the mode of the power control is an absolute value mode, to trigger a first power calculation module;
   a second determining module configured to determine whether a calculated sum of TPC adjustment values of each HARQ process is smaller than a given threshold; if it is smaller than the given threshold, to trigger a first power calculation module, otherwise, to trigger a second power calculation module;
   a first power calculation module configured to obtain a transmission power by adding an increment adjustment value to a retransmission power; and
   a second power calculation module configured to calculate a transmission power of the UE according to a formula in a protocol;
   wherein the parsing module, the first determining module, the second determining module, the first power calculation module and the second power calculation module are each the result of execution on a processor of instructions stored in a memory.

9. The device according to claim 8, wherein
   the parsing module is further configured to wait Physical HARQ Indicator Channel (PHICH) information corresponding to the HARQ process, and determining that HARQ non-adaptive retransmission is needed when NACK is obtained by parsing the PHICH information.

10. The device according to claim 8, wherein when the power control is performed by adopting an absolute value mode and first retransmission is performed,
    the first power calculation module is further configured to determine whether an TPC adjustment value during new data transmission is smaller than 0, if it is smaller than 0, then an increment adjustment value of the first retransmission is an absolute value of the TPC adjustment value during new data transmission.

11. The device according to claim 10, wherein the first power calculation module is further configured to increase the increment adjustment value as retransmission times increase.

12. The device according to claim 8, wherein the second determining module is further configured to calculate the sum of the TPC adjustment values of each HARQ.

13. The device according to claim 12, wherein the second determining module is further configured to not add the increment adjustment value to the TPC adjustment value.

14. The device according to claim 8, further comprising:
    a threshold setting module configured to set a threshold; and/or,
    a step setting module configured to set a minimum adjustment step regulated by a Long Term Evolution (LTE) physical layer protocol in a corresponding mode of the power control;
    wherein the threshold setting module and the step setting module are each the result of execution on the processor of the instructions stored in the memory.

15. The method according to claim 2, further comprising: when the power control is performed by adopting the absolute value mode and first retransmission is performed, determining whether an TPC adjustment value during new data transmission is smaller than 0, if it is smaller than 0, then an increment adjustment value of the first retransmission is an absolute value of the TPC adjustment value during new data transmission.

16. The method according to claim 3, further comprising: when the power control is performed by adopting the absolute value mode and first retransmission is performed, determining whether an TPC adjustment value during new data transmission is smaller than 0, if it is smaller than 0, then an increment adjustment value of the first retransmission is an absolute value of the TPC adjustment value during new data transmission.

17. The method according to claim 4, further comprising: when the power control is performed by adopting the absolute value mode and first retransmission is performed, determining whether an TPC adjustment value during new data transmission is smaller than 0, if it is smaller than 0, then an increment adjustment value of the first retransmission is an absolute value of the TPC adjustment value during new data transmission.

18. The method according to claim 5, further comprising: when the power control is performed by adopting the absolute value mode and first retransmission is performed, determining whether an TPC adjustment value during new data transmission is smaller than 0, if it is smaller than 0, then an increment adjustment value of the first retransmission is an absolute value of the TPC adjustment value during new data transmission.

19. The method according to claim 15, further comprising: before the obtaining a transmission power by adding an increment adjustment value to a retransmission power, increasing the increment adjustment value as increase of retransmission times.

20. The method according to claim 16, further comprising: before the obtaining a transmission power by adding an increment adjustment value to a retransmission power, increasing the increment adjustment value as increase of retransmission times.

21. The method according to claim 17, further comprising: before the obtaining a transmission power by adding an increment adjustment value to a retransmission power, increasing the increment adjustment value as increase of retransmission times.

22. The method according to claim 18, further comprising: before the obtaining a transmission power by adding an increment adjustment value to a retransmission power, increasing the increment adjustment value as increase of retransmission times.

23. The device according to claim 9, further comprising:
    a threshold setting module configured to set a threshold; and/or,
    a step setting module configured to set a minimum adjustment step regulated by a Long Term Evolution (LTE) physical layer protocol in a corresponding mode of the power control;
wherein the threshold setting module and the step setting module are each the result of execution on the processor of the instructions stored in the memory.

24. The device according to claim 10, further comprising:
    a threshold setting module configured to set a threshold; and/or,
    a step setting module configured to set a minimum adjustment step regulated by a Long Term Evolution (LTE) physical layer protocol in a corresponding mode of the power control;
wherein the threshold setting module and the step setting module are each the result of execution on the processor of the instructions stored in the memory.

25. The device according to claim 11, further comprising:
    a threshold setting module configured to set a threshold; and/or,
    a step setting module configured to set a minimum adjustment step regulated by a Long Term Evolution (LTE) physical layer protocol in a corresponding mode of the power control;
wherein the threshold setting module and the step setting module are each the result of execution on the processor of the instructions stored in the memory.

26. The device according to claim 12, further comprising:
    a threshold setting module configured to set a threshold; and/or,
    a step setting module configured to set a minimum adjustment step regulated by a Long Term Evolution (LTE) physical layer protocol in a corresponding mode of the power control;
wherein the threshold setting module and the step setting module are each the result of execution on the processor of the instructions stored in the memory.

27. The device according to claim 13, further comprising:
    a threshold setting module configured to set a threshold; and/or,
    a step setting module configured to set a minimum adjustment step regulated by a Long Term Evolution (LTE) physical layer protocol in a corresponding mode of the power control;
wherein the threshold setting module and the step setting module are each the result of execution on the processor of the instructions stored in the memory.

* * * * *